June 25, 1957

F. A. HILL 2,797,332

RADIACS

Filed Aug. 9, 1954

FRANK A. HILL,
INVENTOR.

BY Theodore H. Lassagne

ATTORNEY.

June 25, 1957  F. A. HILL  2,797,332
RADIACS
Filed Aug. 9, 1954  3 Sheets-Sheet 2
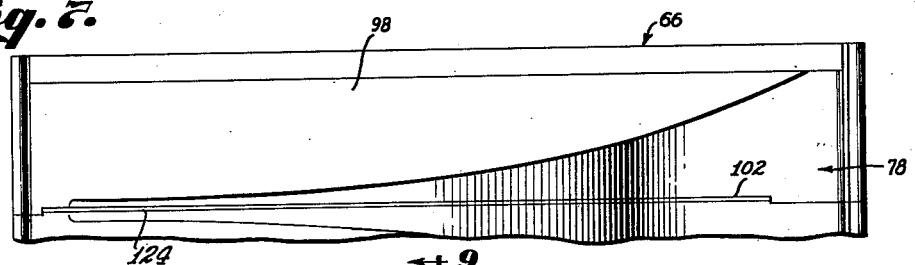
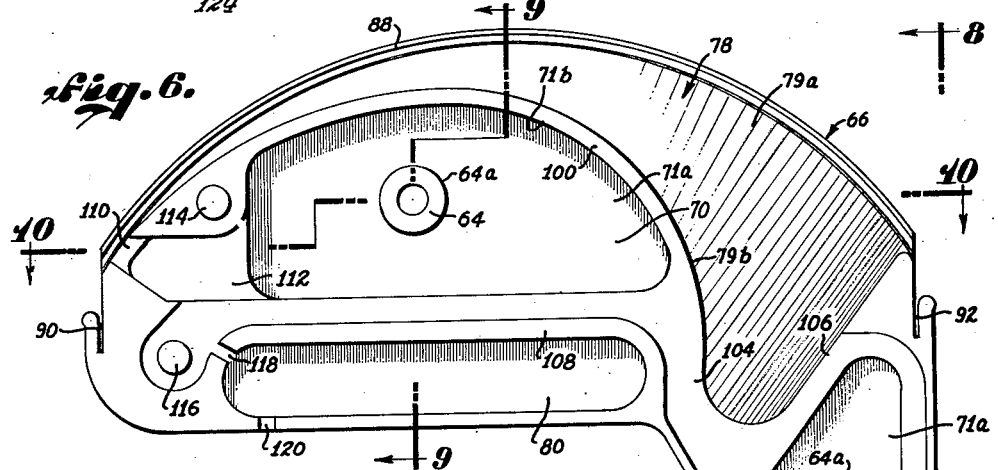
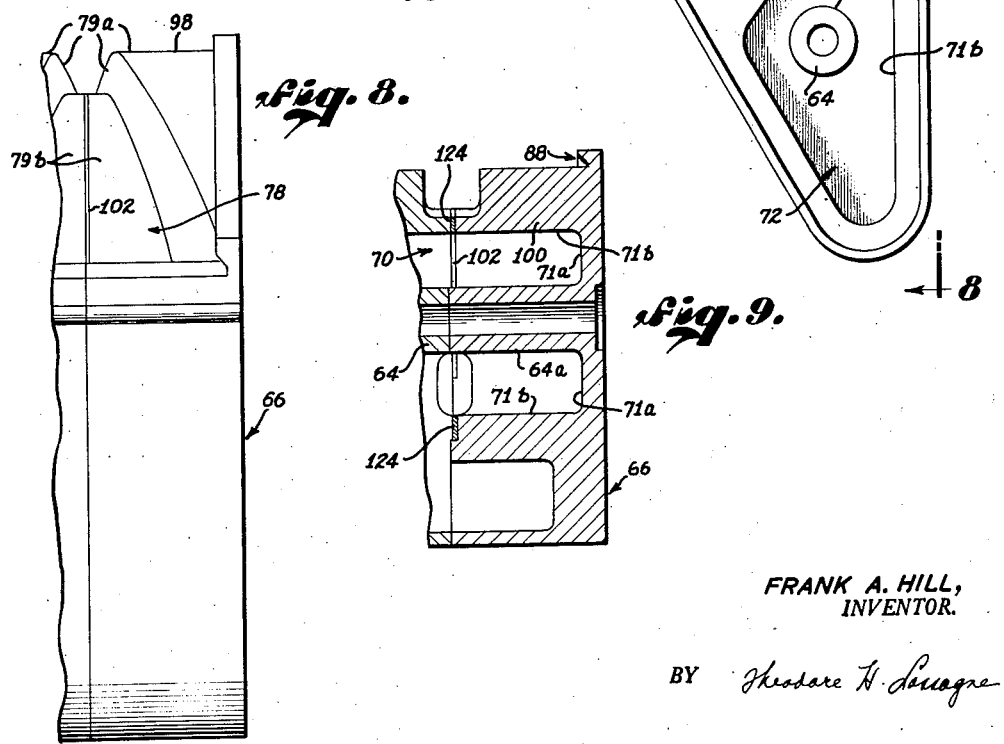
FRANK A. HILL,
INVENTOR.
BY Theodore H. Lassagne
ATTORNEY.

June 25, 1957  F. A. HILL  2,797,332
RADIACS
Filed Aug. 9, 1954  3 Sheets-Sheet 3
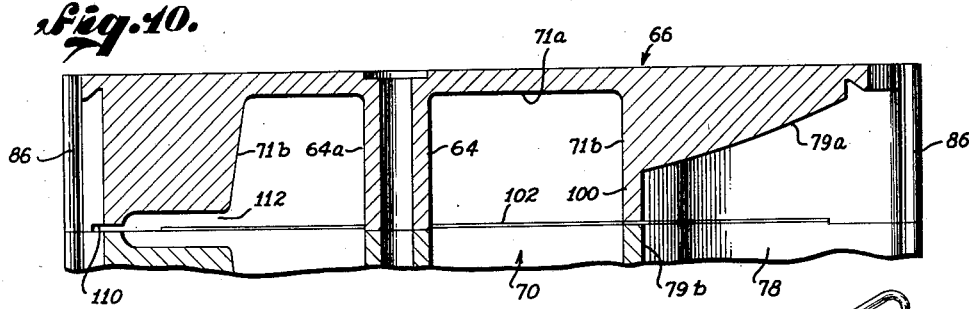
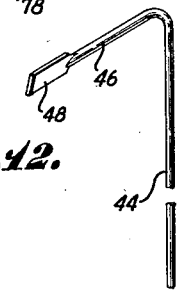
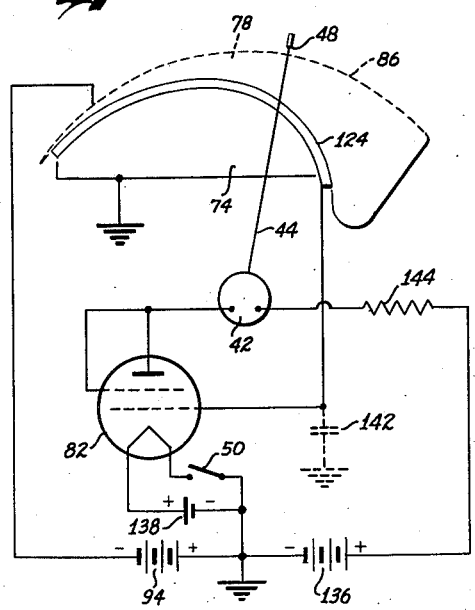
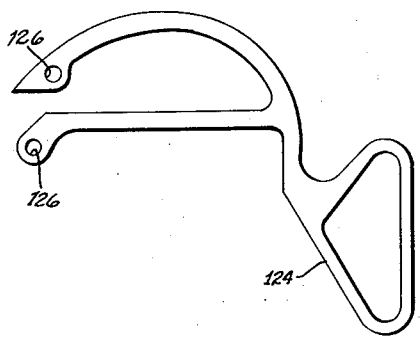
FRANK A. HILL,
INVENTOR.
BY
ATTORNEY.

United States Patent Office 2,797,332
Patented June 25, 1957

2,797,332

RADIACS

Frank A. Hill, Van Nuys, Calif., assignor to Librascope, Incorporated, Glendale, Calif., a corporation of California Application August 9, 1954, Serial No. 448,676

19 Claims. (Cl. 250—83.6)

The present invention relates to the detection and measurement of radiation of the character emanating from radioactive materials, and more particularly to a device for sensing such radiation and supplying a signal representative of its intensity.

In the preferred embodiment of the invention this output signal is in the form of a mechanical analog of the radiation intensity, a feedback from the mechanical output being utilized to render the signal's accuracy independent of variations in the characteristics of the electrical and other components of the device. Alternatively, however, it is possible to directly utilize as an output an electrical signal employed in the device for positioning the mechanical output element, although the accuracy of such an electrical output signal will be less dependable. Either such signal may be employed for the purpose of affording a visual indication of radiation intensity in the vicinity of the sensing device and may additionally or alternatively be employed to control nuclear or X-ray apparatus.

For these purposes, the present invention contemplates the employment of a pair of ionization chambers each containing a gas, such as air, adapted to be ionized by radiation such as radiation emanating from radioactive materials, X-rays, or electrically accelerated particles of any kind. An electrical collector either in the form of a single electrode or a plurality of interconnected electrodes is in electrical communication with both chambers, and means are provided for creating opposing potential gradients between the collector and other electrodes within the respective chambers. The collector potential, translated into an electrical current by means such as an electrometer tube is employed to actuate an electro-mechanical transducer for positioning an output element, and the movement of the output element is fed back to the collector by employing it to vary the radiation-induced ionization of the gas in one ionization chamber with respect to the radiation-induced ionization of the gas in the other ionization chamber; the direction of this ionization variance being such as to bring the current flowing to the collector from the other chamber electrodes to a null point. In the preferred form of the invention, this type of feedback is accomplished by a change in position, with respect to a shaped ionization chamber, of a minute quantity of radio-active material carried by the output element, but varying of the shielding of one chamber differentially with respect to the other or varying the distance separating the radioactive material from one chamber are within the contemplation of the invention.

The invention is shown and described herein as embodied in a "radiac," for detecting and visually indicating the intensity of ambient radiation in the vicinity of the instrument, and will be best understood from the following detailed description thereof when read in connection with the accompanying drawings in which:

Figure 6 is an enlarged front elevational view of a particular sub-assembly shown in Figure 1 and somewhat schematically illustrates the main components in the sub-assembly;

Figure 7 is an enlarged, somewhat fragmentary top plan view of the sub-assembly shown in Figure 6;

Figures 8, 9 and 10 are fragmentary sectional views substantially on the lines 8—8, 9—9 and 10—10, respectively, of Figure 6 and illustrate certain components shown in Figure 6 in further detail;

Figure 11 is a top plan view of a component forming a part of the sub-assembly shown in Figures 6 to 10, inclusive;

Figure 12 is an enlarged, fragmentary perspective view of one of the components shown in Figures 1 and 2 as seen from a position below and to one side of the component; and Figure 13 is a circuit diagram somewhat schematically illustrating the association and electrical connections between the different electrical elements shown in the previous figures.

Figure 4:
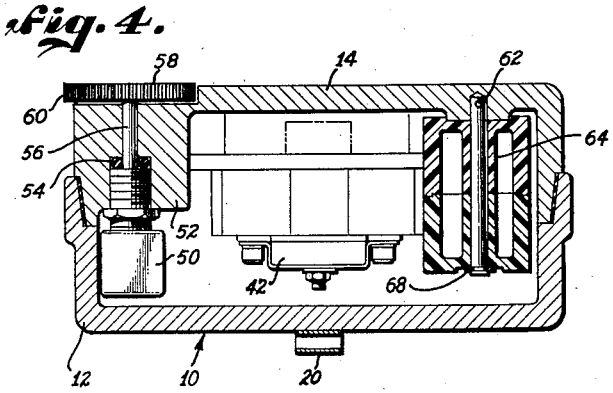
Figure 4 is a sectional view substantially on the line 4—4 of Figure 1.

In the embodiment of the invention shown in the accompanying drawings, the instrument is contained in a casing generally indicated at 10 (Figures 1, 2 and 4) which is formed from two shells 12 and 14 (Figure 4). The two shells 12 and 14 are adapted to be fastened together as by screws 16 and 17 (Figure 1). The screws 16 have their heads somewhat separated from the walls of the casing so as to support a leather strap 18 (Figure 1) which may be extended over a person's head and supported by the back of his neck so as to make the apparatus easily portable. The casing 10 also carries a clip 20 (Figure 2) so that the apparatus may be easily hooked on to a person's belt and carried in this way.

Figure 2:
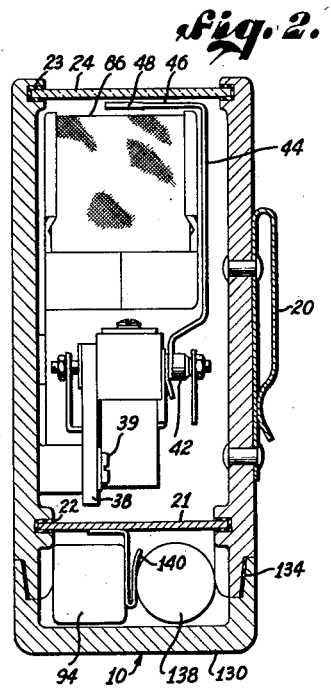
Figure 2 is a sectional view substantially on the line 2—2 of Figure 1 and illustrates in further detail certain components shown in Figure 1.
Figure 3:
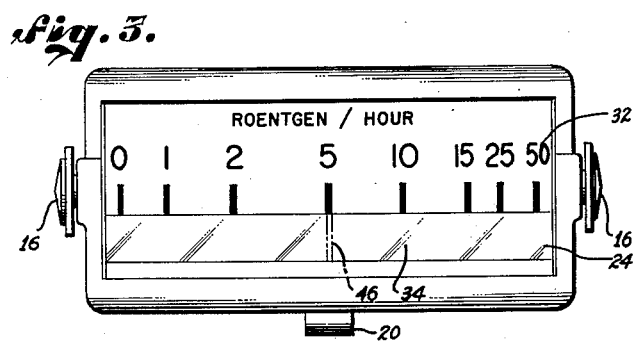
Figure 3 is a top plan view of the apparatus shown in Figure 1.

A plate 21 (Figures 1 and 2) is supported on the bottom of the casing 10 as by internal grooves in the casing and is sealed atmospherically relative to the casing as by rubber gaskets 22. The top of the casing 10 is also provided with grooves 23 (Figure 2) which holds a transparent window 24 (Figures 2 and 3). The window 24 is made from a suitable material such as the plastic known as "Lucite," which is formed from a polymer of methyl methacrylate. The window 24 is sealed to the casing 10 as by rubber gaskets 28 (Figure 1). As shown in Figure 3, the window 24 has a scale portion 32, shown as a portion coated with a self-luminous paint. The scale is preferably logarithmically calibrated and may, for instance, have a range such as 0 to 50 Roentgens per hour. The window also has a transparent portion 34 in contiguous relationship to the scale 32 through which portion an indicator may be viewed.

The plate 21 (Figures 1 and 2) not only cooperates with the casing 10 to form a first sealed compartment, but also cooperates with a cover 130 to form a second sealed compartment below the first compartment. The cover 130 is held in fixed position relative to the plate 21 as by screws 132 and is sealed with respect to the casing 10 as by rubber gaskets 134. The second sealed compartment holds a battery 94 (Figures 1, 2 and 13) for delivering a suitable potential such as 15 volts, a battery 136 (Figures 1 and 13) similar to the battery 94 and a battery 138 (Figures 2 and 3) for delivering a suitable potential such as 1.5 volts. The batteries 94, 136 and 138 are suspended from the plate 20 as by clips 140 (Figures 1 and 2).

A bracket 38 (Figures 1 and 2) is supported within the casing 10 as by screws 39 which extend through elongated sockets 40 (Figure 1) at the bottom of the bracket, and the bracket constitutes a support for an electro-mechanical transducer shown as a meter 42 (Figures 1 and 2) secured thereto. The meter has a pointer 44 (Figures 1, 2 and 12) which extends upwardly to a position just below the window 24, and which then extends inwardly at a right angle to the main portion thereof as at 46, across the transparent portion 34 of the window, as best shown in Figures 2 and 3. By adjusting the bracket 38 as permitted by the elongated sockets 40, the initial positioning of the pointer 44 can be adjusted to coincide with the "0" position on the scale 32.

Figure 5:
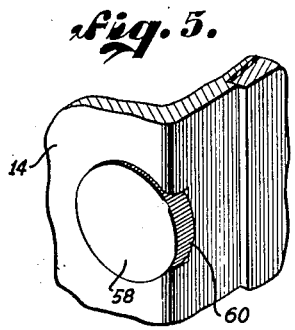
Figure 5 is an enlarged fragmentary perspective view of certain components shown in Figure 4 as seen from a position in front of and slightly to one side of the components.

An on-off switch 50 (Figure 4) has a portion which is screwed into a boss 52 in the casing 10, and which is sealed in the boss as by an O-ring 54. A shaft 56 extends from the switch 50 through a hole in the boss 52 and in the casing and at its outer end supports a knob 58. The knob 58 is recessed within a socket in the casing 10 (see also Figure 5), so that only a portion of the knob is exposed outside of the casing as at 60. To operate the switch 50, a finger is pressed against the exposed portion 60 of the knob 58, and is moved either upwardly or downwardly. The portion 60 may be knurled for better gripping by the finger.

Means are provided for mounting within the casing 10, a main chamber adapted to be traversed by radiation ambient in the vicinity and a smaller balancing chamber which may, but need not be, adapted to be traversed by the same radiation. Both chambers, however, contain a gas, such as air, which is ionizable by radiation of the character issuing from radioactive material.

Figure 1:
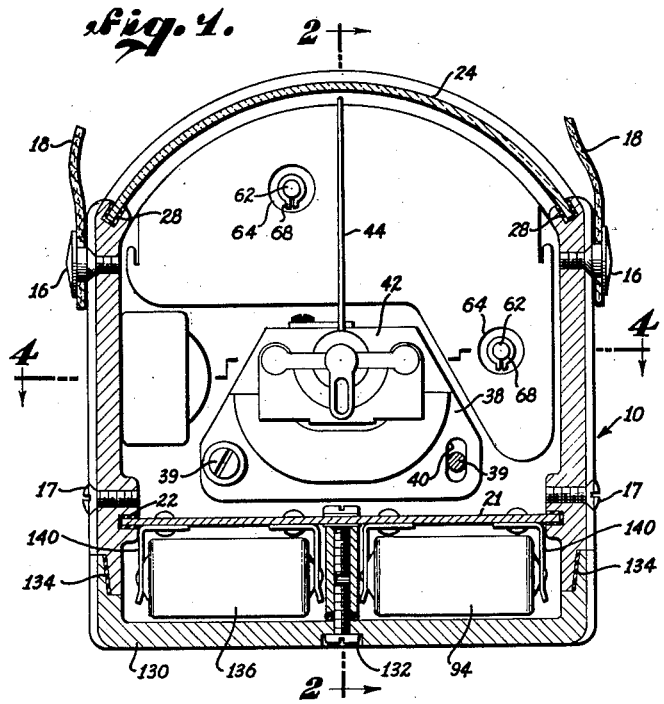
Figure 1 is a view partly in section, of a radiac embodying the invention, looking into the apparatus from a rear position towards the front.

For this purpose, as shown in Figures 1 and 4, a pair of pins 62 are secured in and extend from the back wall of the casing 10 to a point within the casing spaced from its front wall. The pins 62 are adapted to fit in centrally disposed holes in posts 64 which extend from the two halves of a chamber assembly generally indicated at 66 (Figures 6 to 10 inclusive). The posts 64 are adapted to be fixedly positioned relative to the pins 62 as by snap rings 68 (Figures 1 and 4).

The chamber assembly 66 (Figures 6 to 10) is made in two half portions each molded from a suitable material such as polystyrene. In general, the walls are so disposed as to define a two-part main ionization chamber including both a chamber 70 and a chamber 72 which form a functionally unitary chamber schematically illustrated at 74 in Figure 13. The walls of the chamber assembly 66 also define a balancing ionization chamber 78 (Figure 6) of lesser volume than the main chamber. In addition to defining the ionization chambers, the walls of the chamber assembly 66 define a pocket 80 for holding an electrometer tube schematically illustrated at 82 in Figure 13.

The bottom of the balancing ionization chamber 78 is defined by a wall 100 which also defines the top of the chamber 70. A slot 102 (Figures 7, 8 and 9) is provided along substantially the full length of the wall 100 which is common to the chambers 70 and 78. The slot 102 is provided with a relatively narrow dimension in the lateral direction and is formed by undercutting the interior edges of the two half portions comprising the chamber assembly 66. The wall 100 curves downwardly at its right end and communicates as at 104 (Figure 6) with a looped portion 106 of a wall defining the chamber 72. The wall 100 also joins at its right end with a wall 108 separating the bottom of the chamber 70 and the top of the pocket 80.

A pin 114 (Figure 6) extends horizontally outwardly from the left end of the wall 100 and a pin 116 extends horizontally outwardly from the left end of the wall 108. A slot 118 extends through the wall 108, so that an electrical lead can pass from the electrometer tube 82 in the pocket 80 to the pin 116. A slot 120 also extends through the wall defining the bottom end of the electrometer tube so that electrical connections can be made to other terminals in the electrometer tube 82.

A collector in the form of a conductor in electrical communication with all of the ionization chambers is provided in the form of a plate 124 (Figure 11) having a contour corresponding substantially to that of the walls 100, 104, 106 and 108 and is disposed between the two half portions forming the chamber assembly 66. The collector 124 also extends through the slot 102 (best seen in Figure 9) into the chambers 70, 72 and 78. The collector has holes 126 disposed to fit on the pins 114 and 116 (Figure 6) for the proper positioning of the collector at its left end. The right end of the collector is properly and fixedly positioned by a looped portion corresponding to the looped configuration of the wall portion 106.

The collector plate 124 may be made from a suitable material such as cardboard which is coated with a suspension of carbon particles to make the cardboard conductive. For example, it may be coated with a colloidal suspension of carbon particles immersed in a suitable material such as alcohol or water. A colloidal suspension of carbon particles in water suitable for this purpose is known as "Aquadag" and a similar suitable colloidal suspension of particles in alcohol is known as "Dag 154."

Means are provided for creating an electrical potential gradient within the balancing ionization chamber in one direction with respect to the collector plate 124, and a potential gradient within the main ionization chamber in the opposite direction with respect to said collector plate.

For the purpose of creating such a gradient within the chamber 78 the upper extremity of the balancing ionization chamber 78 is defined by a conductive screen 86 (Figures 2, 10 and 13) which fits in grooves 88 (Figure 6) defined by a lip portion at the top of the chamber assembly 66. The screen 86 has a curved shape as indicated by broken lines in Figure 13, which parallels the path of movement of, and is positioned slightly below, the horizontal portion 46 of the pointer 44, as shown in Figure 2 and schematically shown in Figure 13.

The walls 79a of the chamber 78 are also rendered conductive, as by coating with a suspension of carbon particles in the same manner as described in the case of the collector plate 124 and these walls are in electrical contact with the screen 86. The wall 79b of chamber 78 is left uncoated, however, to insulate the screen and coated walls from the collector plate 124 disposed in the slot 102.

The ends of the screen 86 are fixedly positioned in relatively narrow grooves 90 and 92 (Figure 6). The grooves 90 and 92 are respectively formed between the walls of the chamber assembly 66 and tongues which extend upwardly from the chamber assembly. The groove 92 not only supports one end of the screen 86 but also an electrical lead from the negative terminal of a suitable source of voltage such as a battery 94 (Figures 1 and 13). By disposing the lead in the groove 92, the negative voltage from the battery 94 is applied to the screen 86. This negative voltage may be approximately 15 volts.

For the purpose of creating such a potential gradient within the chamber 74, which includes chamber portions 70 and 72, as previously described, the walls 71a of these chamber portions and the surfaces 64a of the posts 64 are similarly conductively coated. The walls 71b are left uncoated, however, to insulate the coated walls from the collector plate 124. The coated walls of these chamber portions are connected to a common ground with the positive terminal of the battery 94 as shown in Figure 13.

The posts 64 (Figures 1, 4 and 6) thus not only serve to properly position the chamber assembly 66 within the casing 10 but also have other important functions. Because of their conductive surfaces, the posts attract electrons within the chamber portions 70 and 72 (Figure 6). Since the posts are centrally positioned within the chamber portions 70 and 72, they attract the electrons which are located a relatively great distance from the walls of the chambers. By attracting these electrons, the posts 64 prevent the electrons from wandering around the chamber portions 70 and 72 in an indecisive manner, and thereby prevent any charges from accumulating in the chamber to impede the optimum operation of the device.

The collector plate 124 is, in effect, connected through a capacitance 142 (Figure 13) to a common ground with the positive terminal of battery 94; the negative terminal of which is directly connected to the conductive walls and screen of chamber 78 and the positive terminal of which is directly connected, via a common ground with the conductive walls and post surfaces of chamber 74. Actually, the capacitance 142, instead of being present in the form shown in dotted lines in Figure 13, is conveniently constituted by distributed capacitances between the collector plate 124 and its associated circuitry including the electrical leads and the elements of the tube 82. This arrangement is such as to bias the collector plate 124 to a potential intermediate the potential of the screen and conductive walls of chamber 78 on the one hand and the potential of the posts and conductive walls of chamber 74 on the other hand.

The arrangement thus far described is such that ambient radiation of the character emanating from radioactive material in the vicinity will traverse the main chamber 74 producing ion pairs therein which will separate, the negative ions passing to the collector 124, while the positive ions pass to the conductive walls and posts of the main chamber. The ambient radiation may also traverse the balancing chamber, but so long as it is smaller than the main chamber, the ion pairs formed therein will be fewer and the number of positive ions passing to the collector will be less than the number of negative ions passing to the collector from the main chamber. A negative charge is thus produced across the capacitance 142.

Means are provided for translating this negative charge into an electrical current. This means comprises an electrometer tube 82, which may be type CK–5886. Tube 82 has a cathode adapted to be energized by the battery 138 upon closure of the switch 50; the negative terminal of the battery being grounded as shown in Figure 13. The screen grid and plate of tube 82 are connected through a damping resistance 144, which may have a value of the order of 100,000 ohms, to the positive terminal of plate battery 136, the negative terminal of which has a common ground with the cathode battery 138. The control grid of tube 82 is connected to the collector 124; this arrangement being such that the impressing of a negative charge on the collector will impress a similar negative charge on the control grid and cause a correspondingly modulated current to flow through the circuit including the tube 82, resistance 144 and battery 136.

Means comprising an electro-mechanical transducer are provided for translating this current into a proportionate mechanical motion. This means comprises the meter 42, which may be an ammeter having a range, for example, of 0 to 50 microamperes, and which is connected in the plate circuit of the tube 82 as shown in Figure 13.

Means are provided for varying the radiation-induced ionization of the gas in the balancing chamber with respect to the radiation-induced ionization of the gas in the main chamber; this means being controlled by the collector 124 through the translating means and the electro-mechanical transducer just described. In the illustrated embodiment of the invention this means comprises a minute quantity, of the order of 5 microcuries, of radiation, the source for which is bonded, as at 48 (Figure 2) to the portion 46 of the pointer 44, which portion is adapted to traverse a path paralleling the curved surface of the screen 86 defining the upper extremity of the balancing chamber 78.

As will be seen in Figures 6, 7 and 8, the cross-sectional area of the ionization chamber 78 changes progressively opposite the path of movement of the radioactive material 48 carried by pointer 44. Figure 6 illustrates that, as viewed therein, the height of the chamber measured from the position of screen 86 gradually increases from left to right in a horizontal direction.

The lateral dimensions of the ionization chamber 78 are defined by a wedge portion 98 (Figures 7 and 8). The wedge portion 98 may be an integral part of the walls defining the chamber assembly 66 and may be formed in a particular shape as by molding at the same time that the walls defining the chamber assembly 66 are formed. In Figure 7, the wedge portion 98 has such a shape that the lateral dimensions of the ionization chamber 78 increase gradually from left to right in the horizontal direction.

The current flowing through the meter 42 produces a deflection of the pointer 44 through a distance dependent upon the current. When the pointer 44 becomes deflected, the radioactive emanations such as alpha particles from the material 48 carried by the pointer enter the ionization chamber 78 at a position at which the cross-sectional area of the chamber is greater than the position at which the emanations enter in the "zero" position of the pointer 44. Because of the increase in the cross-sectional area exposed to the radioactive emanations at the deflected position of the pointer 44, the emanations produce an increased number of charged particles in the chamber.

Upon the production of an increased number of charged particles in the chamber 78, the negative charge received by the collector 124 increases. Progressive deflection of the pointer finally causes the charge produced on the collector 124 by the chamber 78 to balance the charge produced on the collector by the chamber 74, and when the charge produced on the collector 124 by the chamber 78 balances the charge produced on the collector by the chamber 74, current no longer flows through the tube 82 and the meter 42 to produce a further deflection of the pointer 44. In this way, the magnitude of the deflection of the pointer 44 provides an indication of the intensity of radioactivity in the vicinity of the apparatus. The indication provided by the pointer 44 is steady and does not have a hunting characteristic. This results from the operation of the resistance 144, which serves as a damping impedance in reducing any possibilities of overshoots in the pointer 44.

By properly shaping the ionization chamber 78, the scale 32 (Figure 3) can be calibrated on a logarithmic basis. A logarithmic scale has certain advantages as seen in Figure 3. It provides for an accurate reading of relatively low intensities of radioactivity as well as relatively high intensities of radioactivity. It should be appreciated, however, that although a logarithmic scale is preferred, other types of scales such as linear scales may be utilized, provided that the chamber 78 is properly shaped to produce accurate readings on the scale.

Since the pointer 44 is positioned in contiguous relationship to the screen 86, some radioactive emanations from the material 48 pass through the screen into the ionization chamber 78 even in the "zero" position of the pointer. These radioactive emanations produce an ionization of molecules of air in the chamber. Although the ionization of molecules is relatively slight at any instant because of the restricted width of the chamber 78 at the "zero" position on the scale 32, the cumulative effect of this ionization may be relatively great over an extended period of time.

Specifically, a negative charge might accumulate across the distributed capacitance 142 when the pointer 44 is at its "zero" position. This charge might prevent the apparatus disclosed above from responding instantaneously to the radioactive emanations such as gamma rays whose intensity is to be measured. The apparatus might be prevented from providing a proper indication until the negative charge across the distributed capacitance 142 could be overcome by the positive charge from the ionization chamber 74.

In order to prevent this from occurring, the walls 100 and 108 of portion 70 of main chamber 74 are cut down at their left ends to provide an outwardly disposed groove portion 110 (Figures 6 and 10) of moderate depth and an inwardly disposed groove portion 112 of increased depth. The groove portions 110 and 112 are provided in the walls 100 and 108 at substantially the "zero" position of the pointer 44.

By providing the groove portions 110 and 112 adjacent the zero-end of chamber 70 (Figures 6 and 10), the alpha particles from the pointer-carried material 48 are able, when pointer 44 is adjacent its zero position, to enter into the ionization chamber 70 to produce an ionization of molecules in the chamber. The resultant charge produced on the collector 124 is substantially equal in value and opposite in polarity to the charge produced on the collector by the chamber 78 at the "zero" position of the pointer 44. In this way, the apparatus disclosed above is able to respond instantaneously and accurately to any radioactive emanations such as gamma particles passing into the chamber 74.

Without the groove portions 110 (Figures 6 and 10) and 112, the alpha particles from the pointer-carried material 48 would be unable to penetrate into the ionization chamber 74 through the walls of the chamber, since they are large and heavy and would lose their energy quickly by colliding with many molecules in the wall of the ionization chamber. By the arrangement described, however, the undesirable effect which would otherwise be produced in the chamber 78 at the "zero" position of the pointer 44 is counter-balanced by ionization of molecules in the chamber 70.

It is important to note that, in apparatus constructed in accordance with the present invention, the feedback from the output element, pointer 44, renders the output's accuracy independent of the electrical characteristics of the various components. In this respect, apparatus embodying the invention is greatly superior to apparatus in which the potential gradient across a balancing chamber is altered to achieve a balance with a main ionization chamber, for in apparatus constructed according to the present invention, the potential gradient between the coated walls of the two chambers remains constant, and the potential gradients between the collector and such surfaces do not vary substantially; only minor and transient variations occurring during readjustments of the output.

I claim:

1. In a radiation sensing and measuring device, a plurality of chambers containing gas adapted to be ionized by radiation of the character issuing from radioactive materials, a collector in electrical communication with said chambers, means for creating a potential gradient within one of said chambers in one direction with respect to said collector, means for creating a potential gradient within another of said chambers in the opposite direction with respect to said collector, and means controlled by said collector upon variations in the potential thereof for varying the radiation-induced ionization of the gas in one chamber with respect to the radiation-induced ionization of the gas in said other chamber; the direction of said ionization variance being such as to bring the current flowing to said collector to a null point.

2. In radiation sensing and measuring device, a plurality of chambers containing gas ionizable by radiation of the character emanating from radio-active materials, a collector in electrical communication with said chambers, means including a first conductive surface for creating a potential gradient in one of said chambers in one direction with respect to said collector, means including a second conductive surface for creating a potential gradient in the other of said chambers in the opposite direction with respect to said collector, and means controlled by said collector upon variations in the potential thereof for varying the radiation-induced ionization of the gas in one chamber with respect to the radiation-induced ionization of the gas in the other chamber while the potential difference between said first and second conductive surfaces remains constant; the direction of said ionization variance being such as to bring the current flowing to said collector to a null point.

3. In a radiation sensing and measuring device, a main chamber adapted to be traversed by radiation of the character issuing from radioactive materials in the vicinity, a balancing chamber; both of said chambers containing gas ionizable by radiation of the character issuing from radioactive material, a collector in electrical communication with both of said chambers, means for creating a potential gradient in one of said chambers in one direction with respect to said collector, means for creating a potential gradient in the other of said chambers in the opposite direction with respect to said collector, and means controlled by said collector upon variations in the potential thereof for varying the radiation-induced ionization of the gas in said balancing chamber with respect to the radiation-induced ionization of the gas in said main chamber; the direction of said ionization variance being such as to bring the current flowing to said collector to a null point.

4. In a radiation sensing and measuring device, a main chamber adapted to be traversed by radiation of the character emanating from radioactive material in the vicinity, a balancing chamber; both of said chambers containing gas ionizable by radiation of the character emanating from radioactive material, a collector in electrical communication with both of said chambers, means including a first conductive surface for creating a potential gradient in said main chamber in one direction with respect to said collector, means including a second conductive surface for creating a potential gradient in said balancing chamber in the opposite direction with respect to said collector, and means controlled by said collector upon variations in the potential thereof for varying the radiation induced ionization of the gas in said balancing chamber with respect to the radiation-induced ionization of the gas in said main chamber while the potential difference between said first and second conductive surfaces remains constant; the direction of said ionization variance being such as to bring the current flowing to said collector to a null point.

5. Apparatus for indicating the intensity of radioactivity, including a first ionization chamber, a second ionization chamber disposed in contiguous relationship to the first ionization chamber, a collector disposed between the first and second ionization chambers and biased to receive charged particles of a first polarity from the first ionization chamber and to receive charged particles of a second polarity from the second ionization chamber, means associated with the collector for varying the potential produced on the collector by particles received by the collector to produce a balance in the potentials produced on the collector by the first and second ionization chambers, and means for indicating the intensity of radioactivity upon a balance in the potentials produced on the collector by the first and second ionization chambers.

6. Apparatus for indicating the intensity of radioactivity including, a first ionization chamber, a second ionization chamber disposed in contiguous relationship to the first ionization chamber, a collector disposed between the first and second ionization chambers and biased relative to the two chambers to receive charged particles of a first polarity from the first chamber and charged particles of an opposite polarity from the second chamber, adjustably positioned means associated with the collector for varying the ionization of particles in the second ionization chamber in accordance with the potential received by the collector from the first ionization chamber to produce a balance in the potentials provided on the collector by the first and second ionization chambers, and means for indicating the intensity of radioactivity in accordance with the positioning of the last mentioned means.

7. Apparatus for indicating the intensity of radioactivity, including, a first ionization chamber, a collector forming a part of the chamber and biased relative to the chamber to receive charged particles of a first polarity, a second ionization chamber including the collector, the collector being biased relative to the second ionization chamber to receive charged particles of an opposite polarity, an indicator positioned in contiguous relationship to the second ionization chamber, means on the indicator for providing an ionization of particles in the second ionization chamber in accordance with the positioning of the indicator relative to the chamber, and means associated with the collector and the indicator for providing a movement of the indicator relative to the second ionization chamber to obtain a balance in the charges produced on the collector by the ionization chambers.

8. Apparatus for indicating the intensity of radioactivity including, a first ionization chamber, a second ionization chamber shaped to provide an increasing area with increases in distance in a first direction, a collector disposed between the chambers and biased relative to the chambers to receive charged particles having one polarity from one chamber and charged particles having an opposite polarity from the other chamber, an indicator variably positioned in the first direction relative to the second ionization chamber, means on the indicator for producing an ionization of particles in the second chamber in accordance with the positioning of the indicator, and means operative in accordance with the charge on the collector to produce variations in the positioning of the indicating means for a balancing of the charges received by the collector from the first and second ionization chambers.

9. Apparatus for indicating the intensity of radioactivity, including, a first ionization chamber, a second ionization chamber disposed in contiguous relationship to the first ionization chamber, a collector disposed between the ionization chambers to receive charged particles of one polarity from the first ionization chamber and charged particles of the opposite polarity from the second chamber, an indicator disposed in contiguous relationship to the second chamber and carrying a radioactive material to produce charged particles in the second chamber, the second chamber being shaped to produce variable numbers of charged particles with changes in the positioning of the indicator relative to the second chamber, and an electrometer associated with the collector and the indicator to produce changes in the positioning of the indicator in accordance with any unbalances in the potentials produced on the collector by the first and second ionization chambers.

10. Apparatus for indicating the intensity of radioactivity, including a first ionization chamber, a second ionization chamber disposed in contiguous relationship to the first ionization chamber, a collector disposed between the first and second ionization chambers and biased relative to the chambers to receive charged particles of a first polarity from the first ionization chamber and charged particles of an opposite polarity from the second ionization chamber, an indicator disposed in contiguous relationship to the second ionization chamber and carrying a radioactive material disposed to produce an ionization of particles in the second chamber, the second chamber being shaped to provide increases in ionization of particles with increases in movement of the indicator from a zero position, and an electrometer connected to the collector to provide a signal in accordance with any unbalance in the charges produced on the collector by the first and second ionization chambers, the electrometer being associated with the indicator to produce variations in the positioning of the indicator in accordance with any signal provided by the electrometer.

11. Apparatus for indicating the intensity of radioactivity, including a first ionization chamber, a second ionization chamber disposed in contiguous relationship to the first ionization chamber, a collector disposed between the ionization chambers and biased relative to the chambers to receive charged particles of one polarity from the first ionization chamber and charged particles of an opposite polarity from the second chamber, an indicator disposed in contiguous relationship to the second chamber and carrying a radioactive material to produce charged particles in the second chamber, the second chamber being shaped to produce variable numbers of charged particles with changes in the positioning of the indicator relative to the second chamber, an electrometer associated with the collector and the indicator to produce changes in the positioning of the indicator in accordance with any unbalances in the charges produced on the collector by the first and second ionization chambers, and means in the first ionization chamber for providing for the passage of radioactive emanations from the indicator into the chamber for a substantially zero positioning of the indicator to obtain a balance on the collector of the charge produced on the collector as a result of the passage into the second ionization chamber of the radioactive emanations from the indicator.

12. Apparatus for indicating the intensity of radioactivity, including an electrometer, a meter connected to the electrometer to receive the current flowing through the electrometer, a pointer on the meter and adapted to be actuated in accordance with the current flowing through the meter, a collector connected to the electrometer to bias the electrometer in accordance with the charge on the collector for the establishment of an electrical current corresponding to the charge, a first ionization chamber, a second ionization chamber positioned in contiguous relationship to the pointer, the collector being disposed between the ionization chambers and being biased relative to the chambers for receiving charged particles of one polarity from one of the chambers and charged particles of the opposite polarity from the other chamber, and radioactive material on the pointer for varying the ionization of molecules in the second chamber in accordance with the positioning of the pointer to provide a balance in the charges received by the collector from the first and second chambers.

13. Apparatus for indicating the intensity of radioactivity, including a first ionization chamber for receiving radioactive emanations for measurement and for producing a signal related to the intensity of the radioactive emanations, an indicator responsive to the signals produced by the first ionization chamber, a pointer on the indicator, there being material on the pointer for producing radioactive emanations, means for deflecting the pointer on the indicator in accordance with the reaction of the ionization chamber to radioactive emanations, a second ionization chamber responsively disposed relative to the radioactive material on the pointer to produce a signal in accordance with the deflection of the pointer, and means for introducing the signal from the second ionization chamber to the indicator in opposition to the signal produced by the first ionization chamber to produce a resultant signal in the indicator.

14. Apparatus for indicating the intensity of radioactivity, including a first ionization chamber for receiving radioactive emanations for measurement and for producing a signal related to the intensity of the radioactive emanations, an electrometer for receiving the signals from the first ionization chamber, an indicator responsive to the signals produced by the electrometer, a radioactive pointer on the indicator for deflection in accordance with the response of the indicator, a second ionization chamber disposed in responsive relationship to the radioactive pointer and having a configuration for producing a signal variable in accordance with the deflection of the pointer, and means for introducing the signals from the second ionization chamber to the electrometer in opposed relationship to the introduction of signals from the first ionization chamber to the electrometer.

15. Apparatus for indicating the intensity of radioactivity, including first responsive means for providing a signal having characteristics dependent upon the intensity of radioactivity, means including a pointer for providing an indication of the signal produced by the first responsive means, second responsive means associated with the pointer for producing a signal having characteristics dependent upon the deflection of the pointer, and means associated with the first and second responsive means and with the indicating means to produce a deflection of the pointer until a balance in the signal produced by the second response means relative to the signal from the first responsive means.

16. In apparatus for sensing and measuring radiation, a first ionization chamber, a second ionization chamber disposed in continuous relationship to the first ionization chamber, a collector disposed between the first and second ionization chambers and biased relative to the two chambers to receive charged particles of a first polarity from the first chamber and charged particles of an opposite polarity from the second chamber, and adjustably positioned means associated with the collector for varying the ionization of particles in the second ionization chamber in accordance with the charge received by the collector from the first ionization chamber to produce a balance in the charges provided on the collector between first and second ionization chambers.

17. In a radiation sensing and measuring device, a first ionization chamber, a second ionization chamber disposed in contiguous relationship to the first ionization chamber, means for applying fixed potentials to the first and second chambers to produce an ionization of particles in the chambers, a collector disposed between the first and second ionization chambers and biased relative to the two chambers to receive charged particles of a first polarity from the first chamber and charged particles of an opposite polarity from the second chamber, means including electrical circuitry for producing a signal representing any differences between the potentials produced on the collector by the charged particles from the first and second ionization chambers, and means for varying the ionization produced in the second chamber relative to the ionization produced in the first chamber to produce a balance in the potentials produced on the collector by the charged particles from the first and second chambers.

18. In a radiation sensing and measuring device, a first ionization chamber, a second ionization chamber disposed in contiguous relationship to the first ionization chamber, means for applying potentials to the chambers to produce an ionization of particles in the chambers in accordance with the introduction of radioactivity, a collector disposed between the first and second ionization chambers and biased relative to the chambers to receive charged particles of a first polarity from the first chamber and charged particles of an opposite polarity from the second chamber, and means controlled by the potential on the collector for varying the radiation-induced ionization of particles in the second chamber with respect to the radiation-induced ionization of particles in the first chamber in a direction to minimize the potential on the collector and without varying the potentials applied to the chambers.

19. In a device as set forth in claim 18, the last mentioned means including means disposed in contiguous relationship to the second chamber and variably positioned relative to the chamber in accordance with the potential on the collector to obtain an ionization of particles in the second chamber in accordance with its variable positioning.

References Cited in the file of this patent
UNITED STATES PATENTS

| | | |
|---|---|---|
| 2,610,302 | Christian | Sept. 9, 1952 |
| 2,647,214 | Penney et al. | July 28, 1953 |
| 2,683,222 | Failla | July 6, 1954 |